No. 685,491. Patented Oct. 29, 1901.
L. D. SCOTT & R. B. NEPHEW.
COMPOSITION FOR MENDING PUNCTURES IN PNEUMATIC TIRES.
(Application filed Mar. 9, 1901.)
(No Model.)

WITNESSES:
R. G. West
C. H. Kimball.

INVENTORS:
Lewis D. Scott.
Robert B. Nephew.
Per: Lucius C. West,
Atty.

UNITED STATES PATENT OFFICE.

LEWIS D. SCOTT, OF FRIENDSHIP, AND ROBERT B. NEPHEW, OF HORNELLSVILLE, NEW YORK.

COMPOSITION FOR MENDING PUNCTURES IN PNEUMATIC TIRES.

SPECIFICATION forming part of Letters Patent No. 685,491, dated October 29, 1901.

Application filed March 9, 1901. Serial No. 50,425. (No specimens.)

*To all whom it may concern:*

Be it known that we, LEWIS D. SCOTT, residing at Friendship, in the county of Allegany, and ROBERT B. NEPHEW, residing at Hornellsville, in the county of Steuben, State of New York, citizens of the United States, have jointly invented a new and useful improvement in composition of matter for use in mending or closing punctures in pneumatic tires and pores in such tires as well which happen to be porous, of which the following is a specification.

Figure 1:
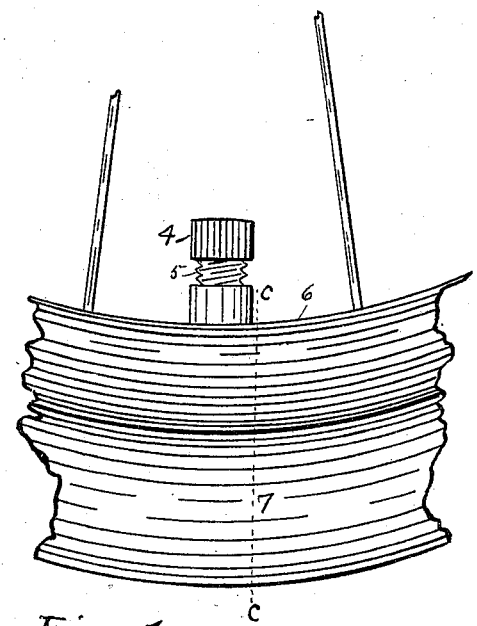
Figure 2:
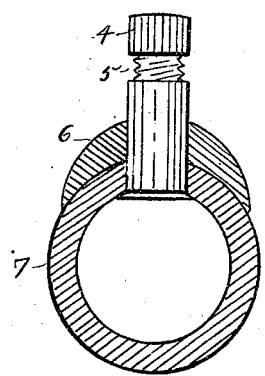
Figure 3:
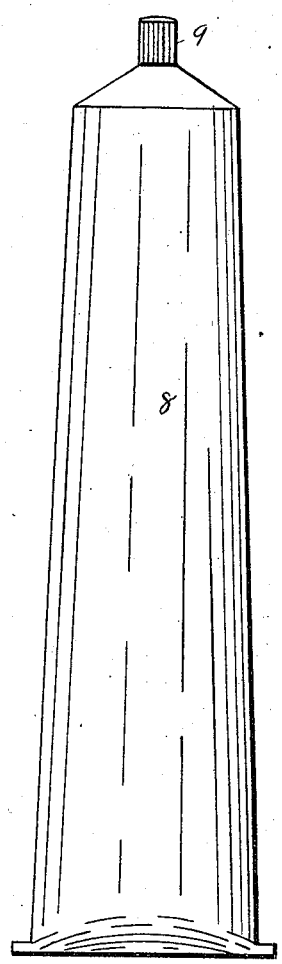

In the drawings forming a part of this specifiation, which we have introduced for the purpose of showing and explaining the manner of using our composition, Figure 1 is a broken portion of a bicycle wheel-rim and tire in side elevation; Fig. 2, a cross-section on line *c c* in Fig. 1, and Fig. 3 is an elevation of a tube in which we design to keep the composition for sale and use.

Our composition consists of the following ingredients in approximately the proportions stated for compounding one gallon and which is prepared in substantially the manner described, viz: rye-flour, one pound; land-plaster, one-half pound; plaster-of-paris, one-fourth pound; molasses, one-half pint; cold water, one pint. Mix these ingredients thoroughly together. Then add to the mass the following: boiling water, five pints; corrosive sublimate, diluted, one-half gill. It is desirable to impart to this composition thus prepared a uniform color resembling slate, which we accomplish by mixing with it blue dissolved Diamond Dye, one gill. Of course it will be understood that the composition for the purpose intended is successful without the addition of this particular color.

The land-plaster and rye-flour constitute the body or foundation. The plaster-of-paris and molasses act as a drier when the compound is spread over the inner surface of the tire and comes through the punctures and pores. The small amount of the plaster-of-paris used compared to the amount and nature of the other ingredients of the mixture prevents any solidification before the mixture is used and spread and fills the punctures and pores. The object of the boiling water is to cook the fluid same as starch is cooked, thus increasing the amount and helping to preserve it. The corrosive sublimate prevents souring and fermentation and tends to preserve the rubber. With our six months experiments and use this is as explicit explanation of effects and conditions as we are able at this time to give; but the results have been successful and entirely satisfactory. It is desirable to use cold water first to prevent a doughy tendency.

In using the above-named composition we first remove the cap 4 from the end of the stem 5 of the wheel-rim 6 and remove the ordinary air-valve from said stem. The end 9 of the tube 8, which latter contains the composition or liquid mixture, is then screwed into the stem 5 and the tube 8 squeezed, forcing the contents into the pneumatic tire 7. Replace air-valve. Then give the wheel several turns to thoroughly distribute the mixture over the internal surface of the punctured or porous tire. Then inflate the tire with air. The result is that the composition so thoroughly fills and covers the punctures or pores that the tire will not leak air.

We are aware that other compositions have been provided for this purpose and to be used in a similar manner; but so far as we are aware our composition is new and the results of use far more satisfactory.

Having thus described our invention, what we claim as new, and desire to secure by Letters Patent of the United States of America, is—

1. The herein-described composition of matter, consisting of rye-flour, land-plaster, plaster-of-paris, molasses, and corrosive sublimate diluted, substantially as set forth and for the purpose specified.

2. The herein-described composition of matter, for mending punctures and pores in pneumatic tires, consisting of rye-flour one pound, land-plaster one-half pound, plaster-of-paris one-fourth pound molasses one-half pint, water six pints, and corrosive sublimate diluted, compounded as stated, substantially as set forth.

In testimony of the foregoing we have hereunto subscribed our names in the presence of two witnesses.

LEWIS D. SCOTT.
ROBERT B. NEPHEW.

Witnesses:
D. C. SIVER,
MARGARET HART.